United States Patent
Zampato et al.

(10) Patent No.: US 12,362,631 B2
(45) Date of Patent: Jul. 15, 2025

(54) WEC CONTROLLER, METHOD AND SYSTEM

(71) Applicant: ENI S.P.A., Rome (IT)

(72) Inventors: Massimo Zampato, Marghera (IT); Daniele Vanzan, Marghera (IT); Giuliana Mattiazzo, Collegno (IT); Elisa Capello, Turin (IT); Giovanni Bracco, Turin (IT); Mauro Bonfanti, Montodine (IT)

(73) Assignee: ENI S.P.A., Rome (IT)

( * ) Notice: Subject to any disclaimer, the term of this patent is extended or adjusted under 35 U.S.C. 154(b) by 0 days.

(21) Appl. No.: 18/573,203

(22) PCT Filed: Jun. 23, 2022

(86) PCT No.: PCT/IB2022/055825
§ 371 (c)(1),
(2) Date: Dec. 21, 2023

(87) PCT Pub. No.: WO2022/269529
PCT Pub. Date: Dec. 29, 2022

(65) Prior Publication Data
US 2024/0348124 A1  Oct. 17, 2024

(30) Foreign Application Priority Data

Jun. 24, 2021 (IT) .......... 102021000016634

(51) Int. Cl.
*H02K 7/18* (2006.01)
*F03B 13/14* (2006.01)

(52) U.S. Cl.
CPC .......... *H02K 7/1823* (2013.01); *F03B 13/14* (2013.01); *F05B 2220/706* (2013.01); *F05B 2240/93* (2013.01)

(58) Field of Classification Search
CPC .......... H02K 7/1823; F05B 2240/93
See application file for complete search history.

(56) References Cited

U.S. PATENT DOCUMENTS

2014/0084586 A1   3/2014  Henwood et al.
2017/0022846 A1*  1/2017  Rao ...................... H02K 7/1823

FOREIGN PATENT DOCUMENTS

WO    2013050924 A1    4/2013

OTHER PUBLICATIONS

Bracco et al., "Optimizing energy production of an Inertial Sea Wave Energy Converter via Model Predictive Control" Control Engineering Practice 96 (2020) 104299, pp. 1-10.
(Continued)

*Primary Examiner* — Sean Gugger
(74) *Attorney, Agent, or Firm* — CANTOR COLBURN LLP

(57) ABSTRACT

A controller of a gyroscope structure associated with a floating hull and equipped with an electrical converter suitable for converting the rotational energy of the floating hull into electrical energy, the controller, receiving as input a perturbed output state including operating variables of the gyroscope structure to determine a driving signal of the electrical converter, which includes
  a first signal portion determined using a predictive control model of the gyroscope structure computed on the basis of the perturbed output state and
  a second signal portion determined using a tube convergence computed on parametric deviations of the operating variables of the perturbed output state, the parametric deviations computed with respect to the operating variables of a unperturbed output nominal state of the gyroscope structure.

11 Claims, 3 Drawing Sheets

(56) References Cited

OTHER PUBLICATIONS

D. Wilson et al. "A comparison of WEC control strategies" Sandia National Labs, Albuquerque, New Mexico, Tech. Rep. SAND2016-4293, Apr. 2016, 98 pages.
International Search Report for International Application No. PCT/IB2022/055825, dated Sep. 16, 2022, 4 pages.
Mammarella et al., Tube-Based Robust Model Predictive Control for Spacecraft Proximity Operations in the Presence of Persistent Disturbance, published Jan. 6, 2018, Aerospace Science and Technology, vol. 77, pp. 585-594.
Ringwood et al. "Energy-Maximizing Control of Wave-Energy Converters" IEEE Control Systems Magazine, Oct. 2014, pp. 30-55.
Written Opinion for International Application No. PCT/IB2022/055825, dated Sep. 16, 2022, 5 pages.

\* cited by examiner

WEC CONTROLLER, METHOD AND SYSTEM

CROSS-REFERENCE TO RELATED APPLICATIONS

This application is a 35 U.S.C. § 371 National Stage patent application of PCT/IB2022/055825, filed on 23 Jun. 2022, which claims the benefit of Italian patent application 102021000016634, filed on 24 Jun. 2021, the disclosures of which are incorporated herein by reference in their entirety.

TECHNICAL FIELD

The present invention relates to a controller of a WEC energy conversion system comprising an electric generator or WEC (Wave Energy Converter) capable of generating electrical energy from sea waves.

The present invention also relates to a method of controlling an electrical converter of a gyroscope structure associated with a floating hull and a relative WEC system.

BACKGROUND

As known, wave power is one of the main sources of renewable energy and recently many large-scale plants have been developed and built for the conversion of wave power into electrical energy. Some plants, for instance inertial-type WEC or ISWEC plants, use a reacting body or PTO that exploits the inertia of a large mass to generate a reaction and to extract its power.

Inertial conversion systems comprising a floating hull are known. The floating hulls are anchored to the seabed, equipped with directional gyroscopic converters, each of which is connected to an electric power generator. The generator is able to convert, by the motion of a flywheel, the rotational energy due to the oscillation of the hull and induced by the wave power into electrical energy.

In this case, a gyroscope structure includes a gyroscope and a flywheel associated with the hull by suspension devices and an electrical converter linked with a rotation shaft substantially orthogonal to main inertia axis of flywheel. The converter includes an electric motor controlled by a driver/inverter which is linked to the rotation shaft by suitable joints and gears. Therefore, by applying an counteracting resistive drive torque, which acts mainly as a damper, and by operating in the even quadrants of the V-I diagram of the driver/inverter, an electric power can be generated through the electric motor, rather than electric power being supplied to the said electric motor.

To maximise the extracted electrical power and to increase the efficiency of the structure, the opposing resistive drive torque is to be suitably modulated.

Classical control systems such as PID (Proportional, Integrative and Derivative) controllers are known and widely used in industrial field, and they typically operate as controllers of SISO (Single-Input Single-Output) systems. Although satisfactory under various aspects, systems with PID controllers have drawbacks. In fact, the wave motion is described in the literature as a random process with statistical distribution characteristics, known as "JONSWAP distribution", whose parameters depend on the sea area of interest. In case of PID controllers, the control parameters are updated by a pre-set gain-scheduling according to a sea state forecast. Therefore, the tabulated values used as control parameters may differ from those required by the actual wave motion, where a consequent loss of extracted energy is inherent.

Use of dynamic systems that employ controllers with state evolution models is known. Such dynamic systems employ controllers MPC (Model Predictive Control). A MPC controller is described in the article by D. Wilson et al. "A comparison of control strategies" WEC Sandia National Labs, 2016.

In the most general form, the MPC controller is based on the feedback from the state and on a control law computed dynamically by minimising an appropriate cost function for optimising the system states.

MPC controllers differ from PID controllers in some essential aspects:

a) the law or control function is based on the solution of the Euler-Lagrange equations which, in the classical theory of optimisation, produces, as a solution, a function of time which results as stationary portion of the cost function (as an superior extremity);

b) the cost function contains inside various terms related to the state, to the input signals and to the kinetic energy associated with the states and control signals and it is normally a convex function;

c) the cost function usually contains terms that become null when the required state is achieved and terms that become null when the energy of the control action is minimised.

Furthermore, the control law of MPC controllers can define dynamic constraints which are used to minimise the cost function. The control law of the MPC controllers is based on the solution of the Euler-Lagrange equations and is essentially a function of time that simultaneously minimises the error with respect to the required state and with respect to the energy involved to obtain this result.

The use of MPC controllers to control WEC systems by using a gyroscopic structure state evolution model is known. This allows to have a single set of control parameters for all sea wave states, relevant to the site where the plant is to be installed. The accuracy of the state evolution model and the estimate of the relevant parameter set affect the performance of the control system.

In other words, these MPC controllers are optimised for systems with fixed and predefined parameters that are therefore less efficient for systems affected by variations in these parameters or by the presence of random disturbances, such as sea wave states. Similarly, sea states not considered during the calibration of the MPC controller parameters can lead to non-optimal energy extraction conditions, namely, poor performance.

A known solution is described in the article—BRACOO G ET AL: "Optimizing energy production of an Inertial Sea Wave Energy Converter via Model Predictive Control" Control Engineering Practice, Pergamon Press, Oxford, GB-vol. 96, 17 Jan. 2020-XP086048062.

The technical problem underlying the present application is devising a control of a gyroscope structure having functional and structural features such as to allow for reduction of errors due to modelling of the wave motion and gyroscope structure, allowing to maximize the energy extracted, thus overcoming the drawbacks mentioned with reference to the known art.

SUMMARY

The solution idea underlying the present invention is to drive, in a constrained way, the future evolution of the operating variables defining the gyroscope structure state, improving the robustness and efficiency of the control. Based on this solution idea, the technical problem is solved by a controller as defined by claim 1 and by specific embodiments described by claims 2-5.

The subject of the invention is also a control method as defined by claim 6 and by specific embodiments described by claims 7-10 and also a WEC system as defined by claim 11.

BRIEF DESCRIPTION OF THE DRAWINGS

Further features and advantages of the invention will emerge from the following description of a preferred embodiment of the system and its variants provided for sake of example with reference to the attached drawings, wherein.

DETAILED DESCRIPTION OF THE DRAWINGS

With reference to these figures, 1 shows an overview of an inertial type WEC system, i.e., ISWEC, comprising a floating hull 3 and a pair of identical and independent gyroscope structures 2 symmetrically arranged to balance the forces with respect to the floating hull 3. Each gyroscope structure 2 comprises an electrical converter 9 suitable for converting the rotational energy of the floating hull 3 into electrical energy.

Figure 1:
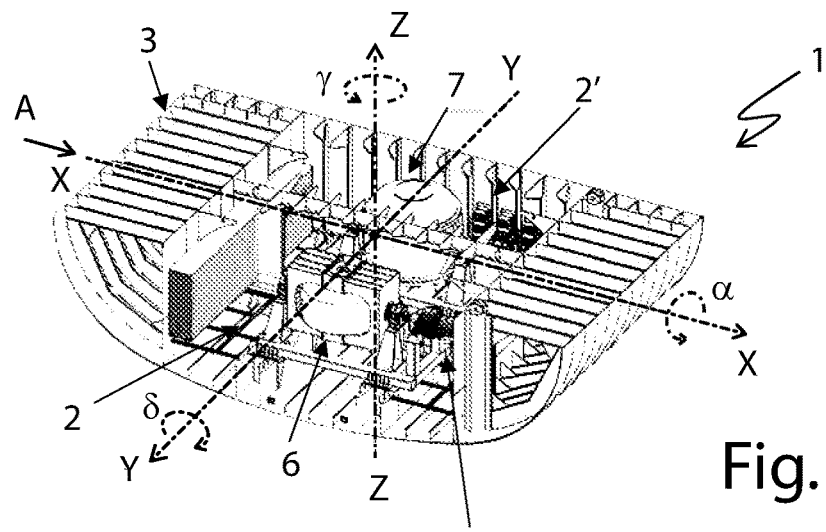
FIGS. 1 and 2 schematically show a WEC system of the inertial type (ISWEC) and a gyroscope structure, respectively.

In the schematic form shown in FIG. 1, the floating hull 3 is substantially symmetrical with respect to a roll axis X, with a first gyroscope structure 2 in which the gyroscope 6 is highlighted and a second gyroscope structure 2'. The second gyroscope structure 2' is shown with a cover protection 7 suitable to cover the underlying flywheel. In the following description, reference will be made to the first gyroscope structure 2 comprising the gyroscope 6.

The floating hull 3 is shaped to allow for rotation according to a pitch axis Y, with a pitch angle $\delta$ and a pitch speed $\dot{\delta}$ due to an angular moment forced by the wave motion. The wave motion, in FIGS. 1 and 2, is indicated by the arrow in direction A.

In a conventional way, not shown in the figures, the floating hull 3 is anchored to the seabed, where the roll axis X is substantially parallel to the direction A of the wave motion. The roll axis X is perpendicular to the pitch axis Y. The floating hull 3 also has a yaw axis Z substantially perpendicular to a plane P identified by the roll axis X and the pitch axis Y.

Figure 2:
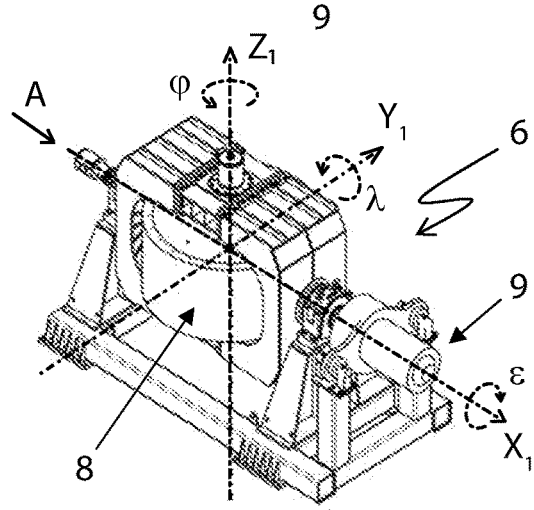

As schematically shown in FIGS. 1 and 2, the gyroscope 6 is equipped with a flywheel 8, which has a base fixed to the bottom of the floating hull 3 and it is free to rotate about a first axis x1, which is parallel to the roll axis X, and to a second axis z1, which is parallel to the yaw axis Z. Furthermore, the flywheel 8 has a first speed $\dot{\varepsilon}$, with respect to the first axis x1, and a second speed $\dot{\varphi}$, with respect to the second axis z1. The flywheel 8 is suitably constrained with bearings to the gyroscope structure 2 which is constrained to the floating hull 3. The whole assembly rotates about the pitch axis Y at the pitch speed $\dot{\delta}$ of the floating hull 3 due to wave motion effect. By gyroscopic effect, the pitch angle $\delta$ of the floating hull 3 can be transformed into a movement or precession angle $\varepsilon$ about the first axis x1. The precession angle $\varepsilon$ allows for the generation of a precession torque supplied to the electrical converter 9.

The electric converter 9, schematically shown in the figures, comprises an electric motor associated with the driver/inverter and driven by a controller 10 through a driving signal u which counteracts the precession torque in order to maximize the extracted power.

Figure 3:
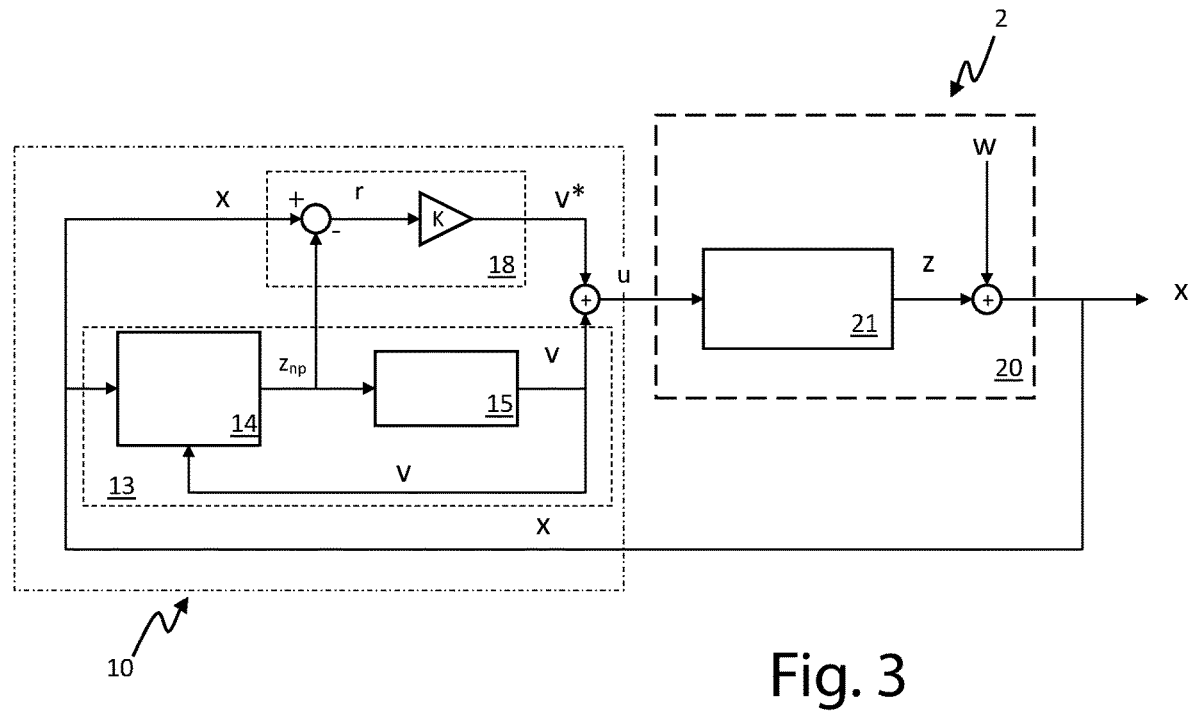
FIG. 3 is a block diagram of a controller made according to the present invention.

FIG. 3 shows, through a block diagram, a portion of the inertial conversion system, WEC 1, of FIG. 1 relevant to the gyroscope structure 2 and the controller 10 designed according to the present invention.

The gyroscope structure 2 is represented by a real plant block 20, i.e., a non-linear system, comprising a structure block 21 which is suitable for representing the actual states z of the gyroscope structure 2. The structure block 21 receives the driving signal u to generate a vector comprising the unperturbed output state z of the gyroscope structure 2.

Perturbations and/or disturbances (w) are added to the unperturbed output state (z) to define a perturbed output state x comprising operating variables of the gyroscope structure 2. The perturbations w comprise a set of external and internal perturbations to the gyroscope structure 2, such as the external driving force of the wave motion which can be filtered by a transfer function and added to the mooring effects and other perturbing elements/forces.

The controller 10 receives the perturbed output state x as input, in order to generate the driving signal u suitable for driving or activating the electrical converter 9. In its most general aspect, the controller 10 is TRMPC like, acronym for Tube-Based Robust Model Predictive Control.

In a first embodiment, the operating variables defining the perturbed output state x, can be represented in a vector-matrix form by:

$$x = \begin{bmatrix} \delta & \dot{\delta} & \varepsilon & \dot{\varepsilon} \end{bmatrix}^T \quad (1)$$

wherein:

$\delta$ is the pitch angle and $\dot{\delta}$ the pitch speed;

$\varepsilon$ is the precession angle about the first axis x1 and $\dot{\varepsilon}$ is the precession speed.

The controller 10 determines the driving signal u by adding a first signal portion v to a second signal portion V*.

The first signal portion v is determined by a predictive control block 13 comprising a predictive control model of the gyroscope structure 2 with the perturbed output state x received as input. In one embodiment, the predictive control model has a cost function that is for instance employed by a conventional MPC controller. In this case, the predictive control block 13 uses a control law, which solutions can be based on the solutions of the Euler-Lagrange equations by providing a time series minimising the error, with respect to a required state, and minimising the energy used to achieve that state.

The second signal portion v* is determined by a nominal convergence module 18 with a nominal tube convergence.

Specifically, the nominal convergence module 18 allows, along with block 13, for a convergence of the evolution of the perturbed output state x to a nominal evolution z of the output state according to the TRMPC control.

The nominal convergence module 18 comprises a gain matrix K defined by taking into account the system uncertainties and according to the definition of tube convergence for a convergence to a predefined value, such as zero, of the parametric deviations r of the gyroscope structure 2. The parametric deviations r are obtained as the difference of the operating variables of the perturbed output state x with respect to a unperturbed output state z of the gyroscope structure 2.

The second signal portion v* is then obtained as the product between the gain matrix K and the parametric deviations or error r.

Figure 4:
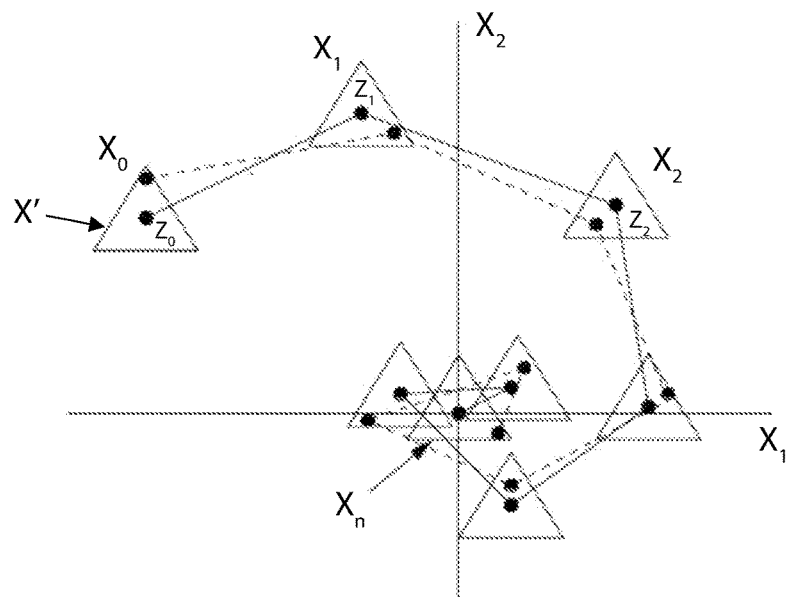
FIG. 4 schematically shows, in a Cartesian diagram, the ideal and actual output states evolution of a tube convergence model applied to a system with two state variables.

FIG. 4 schematically shows the tube convergence according to the TRMPC control for a linear system with two state variables x1 and x2. In the plane of variables x1 and x2, the solid line identifies a required trajectory in a time interval T including N subsequent steps of length $\Delta t$ of the evolution of the nominal states $z_0$-$z_N$ converging to zero. The dotted line represents an actual trajectory generated by the evolution of the N perturbed actual states $X_0$-$X_N$ of the system. With the triangular shape, sections of tube are in practice highlighted, which represent a suitable bound space X', for identifying the acceptable actual perturbed states, $X_0$-$X_N$, in correspondence with each nominal state, $z_0$-$z_N$, taking into account the temporal evolution in N subsequent steps, from initial instant, to, to the final instant, $t_N$, namely ($t_0$+T). Naturally, it is assumed that the bound space X', which is triangular in this case, for each nominal state $z_0$-$z_N$ includes all possible perturbations w as well as all errors due to the uncertainties relevant to the model parameters.

The bound space X' defines the maximum distance of the perturbed output state x with respect to the nominal state $z_0$-$z_N$, which is positioned at the centre of the bound space X'. The bound space X' can, of course, have a shape different from the triangular perimeter and a size that depends on the strength required for the tube convergence.

The system of FIG. 4, with two state variables, x1 and x2, has dimensions representation in space. Obviously, in case of the gyroscope structure 2, in the first embodiment, there are four state variables, as indicated in vector-matrix 1 and, therefore, the bound space X' is four-dimensional. The time interval T is predefined in a design phase considering the dynamic characteristics of the analysed system, such as those of wave motion with reference to the wave period. Of course, the instrumentation and/or hardware characteristics to be used are also relevant.

The nominal states $z_0$-$z_N$ were ideal unperturbed states and are determined on the basis of an undisturbed model of the gyroscope structure 2.

According to one embodiment, the gain matrix K is determined by using a procedure according to the theory of linear matrix inequalities or LMI as described in the M. Mammarella, Capello, Park, Guglieri, Romano 2018 article, entitled "Tube-Based Robust Model Predictive Control for Spacecraft Proximity Operations in the Presence of Persistent Disturbance, published on Jan. 6, 2018 by "Aerospace Science and Technology-Volume 77, pages 585-594".

The definition of this region ("tube") and its width are therefore obtained as the uncertainties of both the model used in the control and the amount of any external disturbances not modelled (for example, the mooring effect).

According to the embodiment shown in FIG. 3, the predictive block 13 is implemented by a nominal unit 14 and a predictive unit 15 arranged in cascade. The nominal unit 14 comprises a nominal unperturbed model of the gyroscope structure 2. The nominal unit 14 receives as input the perturbed output state x and also receives as feedback the first portion of the signal v, generated by the predictive unit 15, to obtain a unperturbed output nominal state $z_{NP}$ of the gyroscope structure 2.

The predictive unit 15 comprises a predictive dynamic control model with a cost function Jr which comprises quadratic terms relative to the states of the gyroscope structure 2, to the driving action as well as a non-quadratic term relevant to the instantaneous power absorbed by the gyroscope structure 2.

Thus, the predictive unit 15 receives as input the unperturbed nominal state $z_{NP}$ and determines a driving signal sequence v=[$v_0$ ... $v_T$] which minimizes the cost function $J_T$ through the predictive control model and an optimisation problem computing. The first signal portion v is therefore determined by the first element $v_0$ of the so-defined driving signal sequence v=[$v_0$ ... $v_T$]. Alternatively, the first signal portion v corresponds to at least one element $v_i$ for i=0, ..., T, of the identified sequence of said driving signal v=[$v_0$ ... $v_T$].

Furthermore, according to this embodiment, the nominal convergence module 18 receives as input the unperturbed nominal state $z_{NP}$, generated by the nominal unit 14, to compute the parametric deviations r. The second portion of signal v* is obtained by multiplying the parametric deviations r with the gain matrix K.

The second portion of signal v* enables the modification of the driving signal u whilst keeping the actual trajectory of the evolution of the actual states $x_0$-$x_N$ of the gyroscope structure 2, more accurately, within the bounding space X' or optimal state. This enables the gyroscope system 2 to be optimally controlled even in the presence of external random perturbations w generated by the wave motion.

Figure 5:
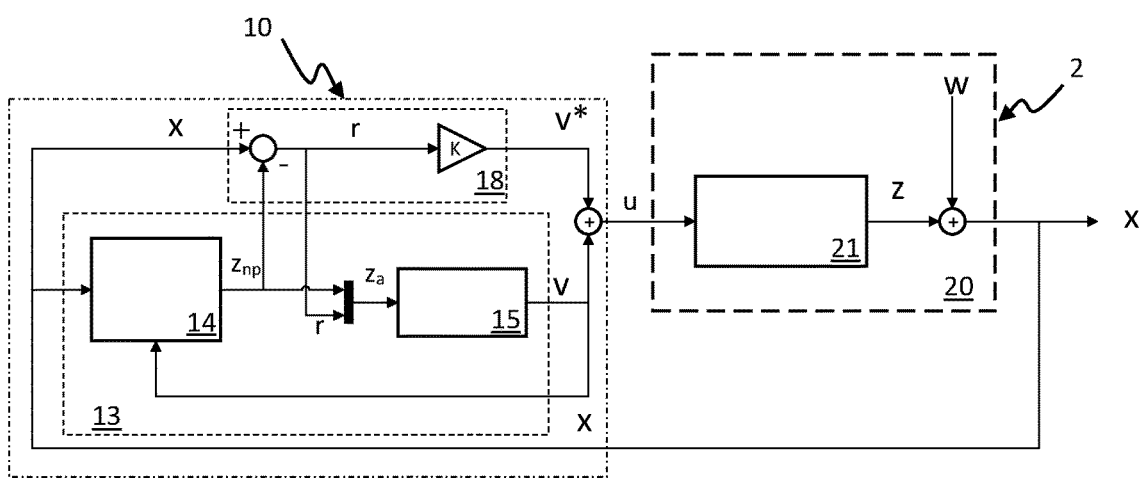
FIG. 5 shows a block diagram of a second embodiment of a controller made according to the present invention.

A second embodiment is shown in FIG. 5 and the controller 10 determines the driving signal u as an augmented driving signal. In the following, only the differences with respect to the previous solution will be specifically described.

The augmented drive signal u comprises a first portion of augmented signal v and the second portion of signal v*.

The predictive unit 15 receives as input an augmented nominal state $z_a$, which includes the unperturbed nominal state $z_{NP}$ and the parametric deviations r computed as the difference between the operating variables of the perturbed output state x and the operating variables of the unperturbed nominal state $z_{NP}$ of the gyroscope structure 2.

The augmented state $z_a$ is a vector that allows block 15 to model and predict the trend of the disturbance w whilst strengthening the prediction of the gyroscopic unit states. In this way, the driving signal sequence v=[$v_0$ ... $v_T$], generated by the predictive unit 15 by minimising the cost function $J_T$, accurate, thus allowing for the determination of an augmented driving signal u which makes the control of the electrical converter 9 more efficient.

The controller thus obtained is quite robust as regards to the evolution control of perturbed states. Such a control that is obtained by both the double feedback of the perturbed output state x and through the dynamic tube convergence model.

Furthermore, the Applicant has been able to verify that the so-designed controller 10 allows for the gyroscope system 2 to be kept or be brought back to the required state even in the presence of uncertainties on the predictive control model parameters of the predictive unit 15 and of the nominal unit 14.

Figure 6:
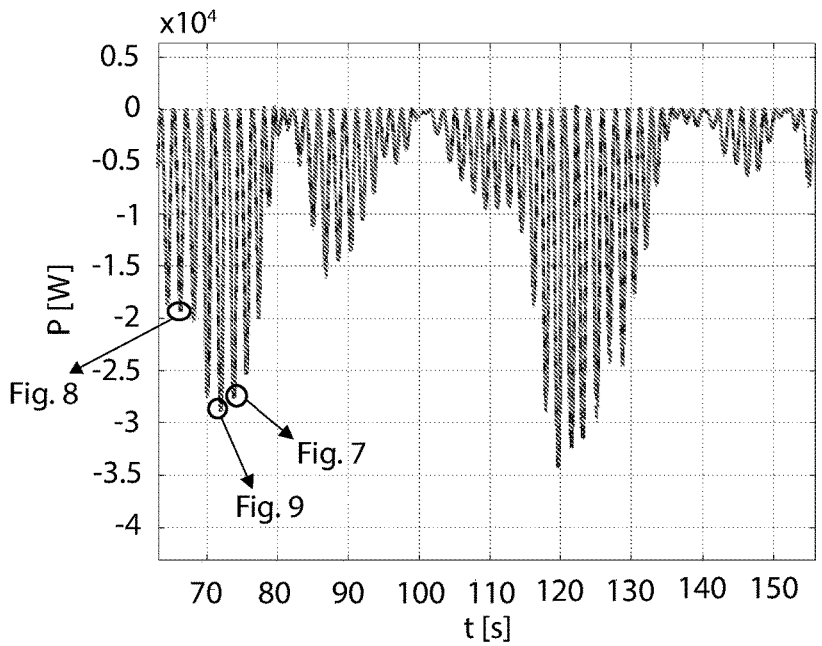
FIG. 6 schematically shows a simulation of the trend of the extracted power over time of an inertial WEC conversion system with a controller implemented according to the present invention.
Figure 7:
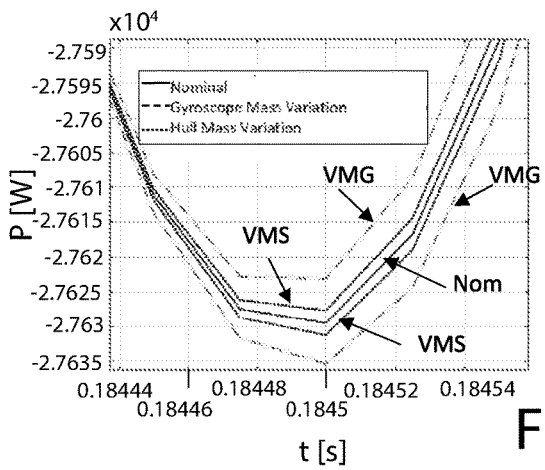
FIGS. 7 to 9 show some details of the graph of FIG. 6.
Figure 8:
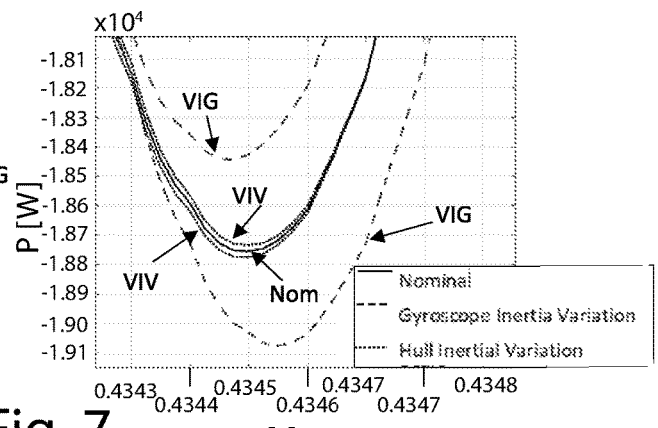
Figure 9:
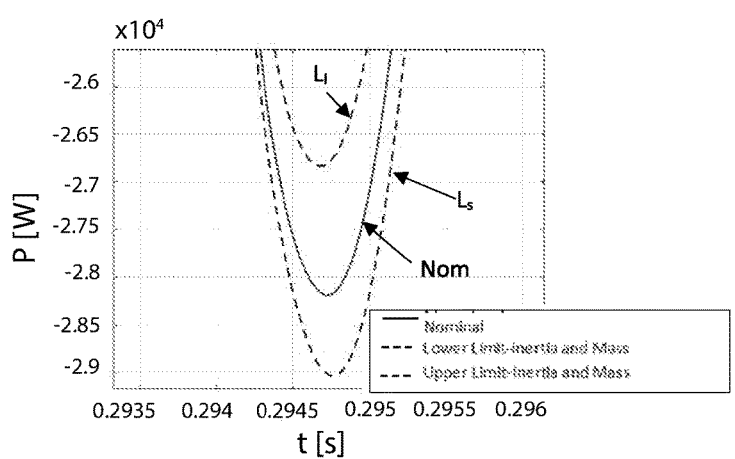

FIG. 6 schematically shows a simulation of the trend of the extracted power as a time function of an inertial WEC conversion system with a controller 10, implemented according to the present invention. The power is negative, being an extracted power. FIGS. 7-9 show some detailed elements relevant to the graph of FIG. 6. The maximum error has been found to be approximately 2%, on the following parameter variations:

Gyroscope Mass Variation (VMG curve): ±10%;
Hull Mass Variation (VMS curve): ±15%;
Gyroscope Inertia Variation (VIG curve): ±15%;
Flywheel Inertia Variation (VIV curve): ±2%.

The charts in FIGS. 7-9 identified by Nom show the extracted power trends, considering the nominal parameters of the model undergoing a forcing wave motion.

FIG. 7 shows, in addition to the nominal curve Nom, two VMG curves and two VMS curves. FIG. 8 shows, in addition to the nominal curve Nom, two VIV curves and two VIG curves. In FIG. 9, in addition to the nominal curve Nom, the curves representing the lower limit $L_I$ and the upper limit $L_S$ of the extracted power are highlighted by jointly varying the mass and inertia of the floating hull 3, the gyroscope and the flywheel.

The present invention also refers to a control method of a gyroscope structure 2 of a WEC system 1, described above, for which details and cooperating parts having the same structure and function as previously described will be indicated with the same numbers and reference codes.

Specifically, the gyroscope structure 2 is associated with a floating hull 3 and includes an electrical converter 9, to convert the rotational energy of the floating hull 3 into electrical energy. In the most general form, the method comprises a TRMPC (Tube-Based Robust Model Predictive Control) of the electrical converter 9.

The controller 10 receives a perturbed output state x comprising the operating variables of said gyroscope structure 2.

According to the present invention, the method devises to drive the electrical converter 9 by a driving signal u, obtained by adding a first portion of signal (v) and a second portion of signal v*.

The method devises to determine the first portion of signal v by using a predictive control model of the gyroscope structure 2 computed upon the perturbed output state x.

Furthermore, the method devises to determine the second signal portion v* by using a nominal convergence module 18 with dynamic tube convergence. The dynamic tube convergence is computed upon parametric deviations r of the operating variables of the perturbed output state x. These parametric deviations r are defined as the difference of the operating variables between the perturbed output state x and a unperturbed output nominal state $z_{NP}$ of the gyroscope structure 2. The unperturbed output nominal state $z_{NP}$ is obtained by a unperturbed nominal model of the gyroscope structure 2.

In a first embodiment, the method devises to use the predictive control model implemented by a conventional MPC controller to determine the first signal portion v.

Furthermore, the method devises to use a gain matrix K, defined as a "dynamic tube convergence", i.e., to a predefined value, preferably zero, of the parametric deviations r of the gyroscope structure 2. Dynamic tube convergence, generally dealt with linear systems, is shown in its more general implementation in FIG. 4 for a system with two state variables, x1 and x2. In this way, in the state space, the gain matrix K allows for an evolution of perturbed output states $X_0$-$X_n$ towards required unperturbed output states $z_0$-$z_n$ of the gyroscope structure 2.

The required unperturbed states $z_0$-$z_n$ are determined a priori upon a nominal model of the gyroscope structure 2, i.e., considering an undisturbed and linear system.

In a design phase, the method devises the definition of the time interval T, the number N of subsequent steps as well as the size and shape of the bound space X' for each required undisturbed state $z_0$-$z_n$.

In this way, in the state space, the parametric deviation r, for each perturbed output state x, multiplied by the parameters of the gain matrix K, keeps the actual trajectory of the gyroscope structure 2 within the bound space X', defined for each required state, whereas the evolution of undisturbed required states, $z_0$-$z_n$, converges to a predefined final required state $z_n$. Naturally, it is assumed that the bound space X' surrounding each required unperturbed state $z_0$-$z_n$ includes all possible causes of disturbance or perturbations w.

According to one embodiment, the tube gain matrix K is determined offline by using the linear matrix inequality theory. In one embodiment, the matrices A and B, used in the classical representation of a linear system in the state space discretization, are considered along with the weight matrices Q, R and P, used within the cost function Jr, as detailed in a next chapter.

In this way, the second portion v* of the driving signal u is determined in order to keep the evolution of the perturbed state inside the tube defined by the bound space X', for a convergence towards the unperturbed state.

According to an embodiment shown in FIG. 3, the method devises to determine the first signal portion v through the implementation of a predictive block 13 arranging, in cascade, a nominal unit 14 and a predictive unit 15. In the nominal unit 14, a unperturbed nominal model of the gyroscope structure 2 is used to generate the unperturbed nominal state $z_{NP}$, by using the perturbed output state x and feedback of the first signal portion v.

In the predictive unit 15, a predictive dynamic control model of the gyroscope structure 2 is driven by the unperturbed nominal state $z_{NP}$ received as input, to generate said first portion of the signal v.

The predictive dynamic control model devises a cost function J-which comprises quadratic terms relating to the states of the gyroscope structure 2 and to the driving action, as well as, it comprises a non-quadratic term $J_T$ relating to the instantaneous power absorbed by the gyroscope structure 2.

The method devises to use a computing according to an optimisation problem in which a sequence of driving signal $v=[v_0 \ldots v_T]$ is determined in order to minimise the cost function $J_T$.

Therefore, the method devises to determine the first signal portion v by using the first element $v_0$ of the driving signal sequence $v=[v_0 \ldots v_T]$. Alternatively, the first signal portion v is obtained by using at least one element $V_i$ for $i=0, \ldots, T$ of the identified sequence of driving signal $v=[v_0 \ldots v_T]$.

Furthermore, the method devises to use the unperturbed nominal state $z_{NP}$, generated by the nominal unit 14, to compute the parametric deviations r and to define the second portion of the signal v*.

In an alternative form shown in the more general aspect in FIG. 5, the method devises to generate the driving signal u as an augmented driving signal by providing as input an augmented state $z_a$ to the predictive unit 15. The augmented state $z_a$ includes the unperturbed nominal state $z_{NP}$ and the parametric deviations r computed as the difference between the operating variables of the output state x and the operating variables of the unperturbed output nominal state $z_{NP}$ of the gyroscope structure 2.

The augmented state $z_a$ is a vector that allows block 15 to model and predict the trend of the disturbance w whilst strengthening the prediction of the state of the gyroscopic unit.

In this way, the driving signal $v=[v_0 \ldots v_T]$ obtained is more accurate and the control of the electric converter 9 is more efficient.

The so-designed method has achieved the prefixed goal and purposes, by allowing for the generation of a so-called robust driving signal u with respect to the internal and external perturbations of the gyroscope structure of the WEC system.

Furthermore, the correction produced by the controller and obtained by the tube convergence, carried out according to the present invention, allows the gyroscope structure to be brought back into operating conditions close to the required state, even in the presence of uncertainties on the parameters of the nominal model in the nominal unit and in the predictive block or in the presence of external disturbances not previously considered and/or modelled.

Cost Function

Considering the states of the simplified model indicated above, the cost function Jr of the predictive dynamic control model and relevant to the predictive unit 15 is detailed according to the formula:

$$J(v_E, z) = \sum_{k=0}^{N-1} (P_k + \|z_k\|_Q^2 + \|v_{E_k}\|_R^2) + \|z_N\|_P^2$$

wherein:

$P_K$ represents the power extracted at the k-th step given by the product of the precession speed of the gyroscope $\varepsilon$, comprised in the vector comprising the actual output state (z) of the gyroscope structure 2, and the control torque or driving signal u;

$z_K$ represents the energy of the unperturbed state at the k-th step computed as the sum of the squares of the vector elements of the actual output state z of the gyroscope structure 2 weighted with the coefficients contained within a diagonal matrix Q;

$v_{Ek}$ represents the energy of the control variable at the k-th step computed as the square of its value and weighted by a weight matrix (R). In one embodiment, the weight matrix (R) is a scalar such as vEk.

$Z_N$ represents the energy of the state at step N (i.e., at the end of the prediction time horizon, consisting of N steps) weighted with the coefficients contained within a diagonal matrix P.

The cost function Jr includes quadratic terms relating to the states of the gyroscope structure 2 and to the control or driving action, as well as includes a non-quadratic term relating to the instantaneous absorbed power. Due to the instantaneous power term, which is a mixed-term by definition, the cost function Jr is not convex and its minimisation is sought by the determination of the driving signal v.

The power extracted at the k-th step, the energy of the state at the k-th step $z_K$ and the energy of the control variable $v_{Ek}$ are all sum-up together, being them computed for the time interval T consisting of N steps.

By the matrices Q, relevant to the state, and R, relevant to the control variable, the contributions of each term are adjusted in the total cost function computing. As the weight coefficients increase, the energy of the associated term is reduced.

According to one embodiment, the matrix P is computed according to the theory of linear matrix inequalities or LMI along with the gain matrix K.

The invention claimed is:

1. A controller of a gyroscope structure associated with a floating hull and equipped with an electrical converter suitable for converting the rotational energy of said floating hull into electrical energy, said controller receiving in input, a perturbed output state (x) comprising operating variables of said gyroscope structure, wherein determining a driving signal (u) to drive said electric converter, the controller comprising:
    a first signal portion (v) determined using a predictive control model of said gyroscope structure computed on the basis of said perturbed output state (x), and
    a second signal portion (v*) determined using a nominal tube convergence computed on parametric deviations (r) of the operating variables of said gyroscope structure, said parametric deviations (r) being computed as the difference of said operating variables of said perturbed output state (x) with respect to a unperturbed output nominal state ($z_{NP}$).

2. The controller according to claim 1, further comprising a nominal convergence module equipped with a gain matrix (K) suitable for defining a convergence to a predefined value of said parametric deviations (r) considering a temporal evolution of required unperturbed states ($z_0$-$z_N$) of said gyroscope structure, said gain matrix being defined considering a bound space (X') for each required unperturbed state ($z_0$-$z_N$).

3. The controller according to claim 2, further comprising a predictive block equipped with a nominal unit and a predictive unit arranged in cascade, said nominal unit comprising a unperturbed nominal model of said gyroscope structure,
    said nominal unit receiving as input, said perturbed output state (x) and, as feedback, said first signal portion (v) generated by said predictive unit to generate said unperturbed output nominal state ($z_{NP}$), and
    said predictive unit comprising a predictive dynamic control model receiving said unperturbed output nominal state ($z_{NP}$) as input to generate said first signal portion (v), or said predictive unit receiving as input, said unperturbed output nominal state ($z_{NP}$) and further said parametric deviations (r) to generate said first signal portion (v).

4. The controller according to claim 3, wherein said nominal convergence module receives as input, said unperturbed output nominal state ($z_{NP}$) generated by said nominal unit.

5. The controller according to claim 1, wherein said predictive dynamic control model of said predictive unit comprises a cost function ($J_T$) which has quadratic terms relevant to the states of said gyroscope structure and to said driving signal and further comprises a non-quadratic term relevant to an instantaneous power absorbed by said gyroscope structure and in that a computing for minimising the cost function ($J_T$) determines a sequence of driving signals ($v=[v_0 \ldots v_T]$), said first signal portion (v) being determined by at least one element ($v_i$ i=0 . . . . T) of said sequence of driving signals ($v=[v_0 \ldots v_T]$).

6. A method of controlling an electrical converter of a gyroscope structure associated with a floating hull said electrical converter being configured to convert the rotational energy of said floating hull into electrical energy, the method providing to receive a perturbed output state (x) comprising operating variables of said gyroscope structure, the method including the following steps:
- driving said electrical converter by means of a driving signal (u) comprising a first signal portion (v) and a second signal portion (v*);
- determining said first signal portion (v) using a predictive control model of said gyroscope structure computed on the basis of said perturbed output state (x) and
- determining said second signal portion (v*) using a nominal tube convergence computed on parametric deviations (r) of the operating variables of said perturbed output state (x), said parametric deviations (r) being computed on the basis of the operation of a unperturbed output nominal state ($z_{NP}$) of said gyroscope structure.

7. The method according to claim 6, further including the following steps:
- defining an evolution of required unperturbed states ($z_0$-$z_n$) of said gyroscope structure by a nominal model of said gyroscope structure for a convergence to a predefined final required state ($z_n$), said evolution of states being determined in a time interval (T) with N subsequent steps;
- defining a parametric deviation (r) for each perturbed output state ($x_0$-$x_N$) compared with a corresponding required unperturbed state ($z_0$-$z_n$); and
- multiplying said parametric deviation (r) by the parameters of a gain matrix (K) so as to keep a real trajectory, which is defined by the evolution of said perturbed output states ($x_0$-$x_n$), within one bound space (X'), said bound space being predefined by a surrounding of said required unperturbed states ($z_0$-$z_n$).

8. The method according to claim 6, further including the following steps:
- using a unperturbed nominal model of said gyroscope structure to generate said unperturbed nominal state ($z_{NP}$) starting from said perturbed output state (x) of said gyroscope structure and from a feedback of the first signal portion (v), and
- using a predictive dynamic control model of said gyroscope structure on the basis of the unperturbed nominal state ($z_{NP}$) received as input to generate said first signal portion (v) or using a predictive dynamic control model of said gyroscope structure on the basis of said unperturbed nominal state ($z_{NP}$) and further on said parametric deviations (r) received as input to generate said first signal portion (v).

9. The method according to claim 6, wherein said predictive dynamic control model devises a cost function ($J_T$) which has quadratic terms relating to the states of said gyroscope structure and to said driving signal (u) and also a term non-quadratic related to the instantaneous power absorbed by said gyroscope structure,
- using a computing according to an optimisation problem that minimises the cost function ($J_T$) in which a sequence of driving signals (v=[$v_0$ ... $v_T$]) is determined, and
- determining the first signal portion (v) based on at least one element ($v_i$ i=0, ..., T) of said sequence of driving signals (v=[$v_0$ ... $v_T$]).

10. The method according to claim 6, further including the following steps:
- providing for a nominal unit suitable for defining said ideal unperturbed output state ($z_{NP}$) by receiving said perturbed output state (x) as input and said first signal portion (v) as feedback and
- computing said parametric deviations (r) using said ideal unperturbed output state ($z_{NP}$) generated by said nominal unit.

11. A Wave Energy Converter (WEC) system comprising:
a floating hull;
at least one gyroscope structure associated with said floating hull and equipped with an electrical converter suitable for converting the rotational energy of said floating hull into electrical energy,
a controller receiving as input, a perturbed output state (x) comprising operating variables of said at least one gyroscope structure, wherein said controller comprises a first signal portion (v) determined using a predictive control model of said gyroscope structure computed on the basis of said perturbed output state (x), and a second signal portion (v*) determined using a nominal tube convergence computed on parametric deviations (r) of the operating variables of said gyroscope structure, said parametric deviations (r) being computed as the difference of said operating variables of said perturbed output state (x) with respect to a unperturbed output nominal state ($z_{NP}$).

* * * * *